Dec. 24, 1968   E. E. HANSON ETAL   3,417,565
FLUID COUPLING

Filed July 19, 1967   2 Sheets-Sheet 1

INVENTORS
EDWIN E. HANSON
HARRY B. NEWMAN

BY
*Myer, Tjensvold, Feix, Phillips & Lempio*

ATTORNEYS

3,417,565
FLUID COUPLING
Edwin E. Hanson, Peoria, and Harry B. Newman, Washington, Ill., assignors to Caterpillar Tractor Co., Peoria, Ill., a corporation of California
Filed July 19, 1967, Ser. No. 654,572
10 Claims. (Cl. 60—54)

ABSTRACT OF THE DISCLOSURE

A fluid coupling having an impeller and a runner and in which hydraulic fluid is supplied to the toroidal chamber through passageways opening into the impeller pockets, fluid also being supplied through the clearance between the impeller and runner faces, air and foam being bled from the coupling through passageways in the runner blades, and also through passageways in a casing enveloping the impeller.

---

Fluid couplings are well known in the prior art. Such couplings have been employed in the transmission systems associated with such high-speed devices as gas turbine engines. The known fluid couplings employed in high-speed transmission systems have usually been of the "dump-and-fill" type. This type of coupling is alternately filled and emptied with a hydraulic fluid such as oil.

The known fluid couplings have, however, presented a number of disadvantages with respect to their use. For example they have usually been of a larger size than is economical for high-speed transmission purposes. Also the rate of filling and emptying has been relatively slow. As a consequence, the period of torque interruption has been relatively long. The known couplings have thus failed to achieve a high level of performance, comparable to that of a power shift, planetary transmission disc-type clutch.

The present invention provides a fluid coupling which is designed to overcome the above discussed disadvantages of the couplings of the prior art.

The advantages of the present invention will become apparent to one skilled in the art from the following description when read in conjunction with the accompanying drawings in which.

Figure 1:
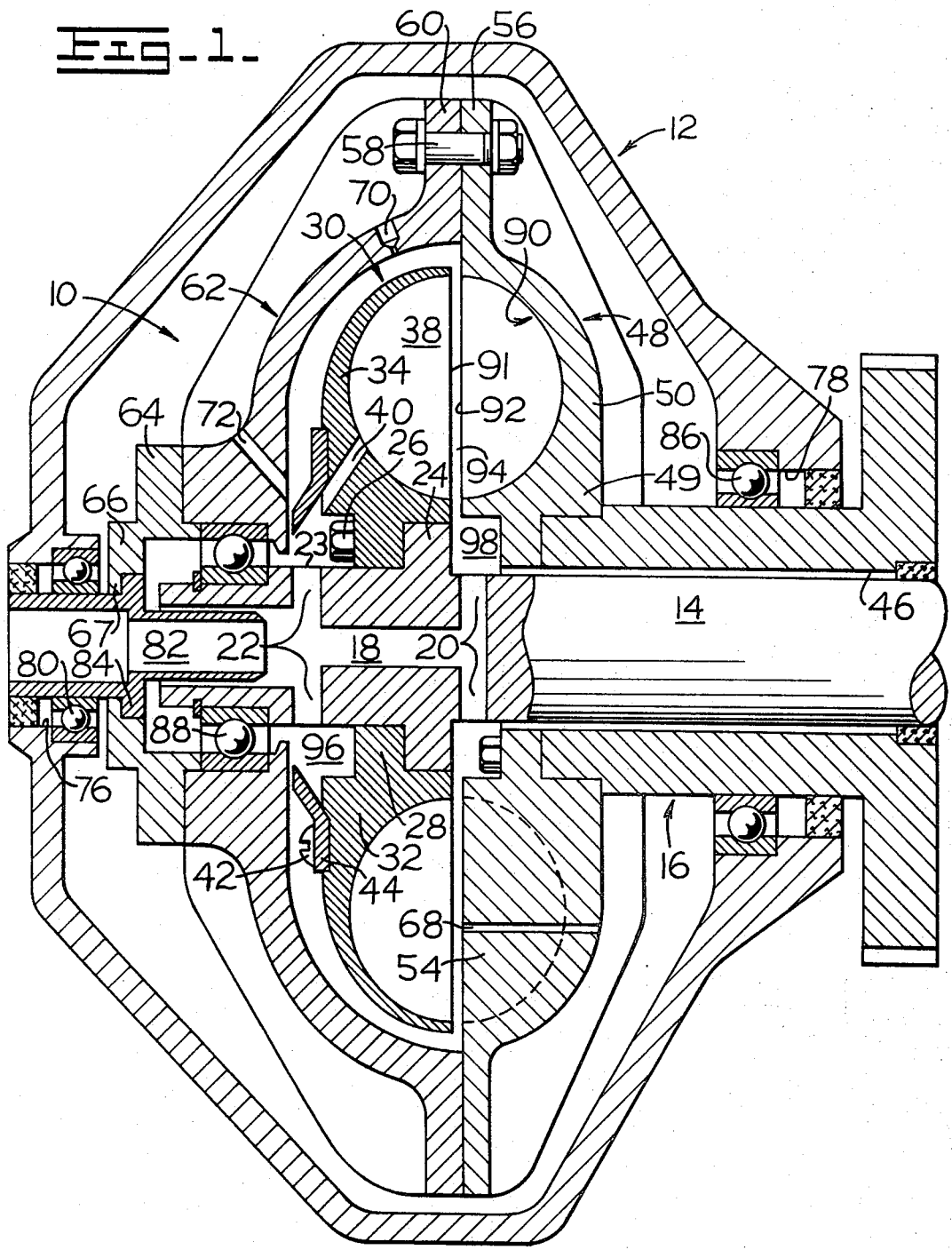
FIG. 1 is a vertical cross-sectional view of a coupling constructed in accordance with the invention, and being shown mounted in a housing.

In FIG. 1, there is shown a fluid coupling 10 constructed in accordance with the invention. The coupling is mounted in a housing 12 and designed to transmit torque from a drive shaft 14 to a driven shaft 16.

The drive shaft 14 is formed adjacent its outer end with an axially extending fluid passageway 18. Two oppositely directed fluid passageways 20 extend radially and oppositely from the inner end of the passageway 18 to the surface of the shaft 14. Spaced axially-outwardly from the passageways 20 are passageways 22 extending radially from the passageway 18 to the surface of the shaft 14.

Figure 4:
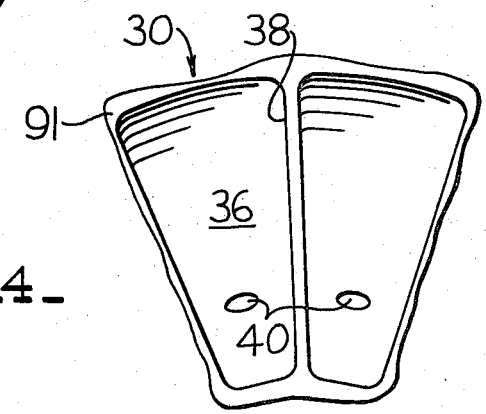
FIG. 4 is a front-elevational view of a portion of an impeller incorporated in the coupling of FIG. 1.

The drive shaft 14 is formed with a peripheral flange 24 located adjacent to and axially-outwardly of the passageways 20. Secured to the flange 24 by means of bolts 26 is the annular attachment flange 28 of an impeller 30. The impeller 30 provides a hub 32 from which extends a curved wall 34. The impeller is divided into a series of pockets 36 (see also FIG. 4) by means of a series of blades 38. The hub 32 has four pairs of fluid passageways 40. The passageways 40 of each pair are located at the opposite sides of one of the blades 38.

Mounted on the outer surface of the wall 34 by means of bolts 42 is an annular lip member 44. The lip member 44 projects outwardly from the wall 34 adjacent the passages 40.

Figure 3:
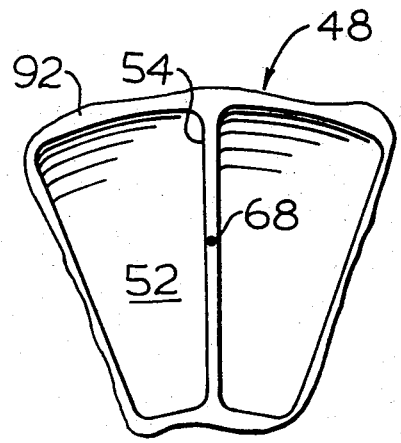
FIG. 3 is a front-elevational view of a portion of a runner incorporated in the coupling of FIG. 1.

The driven shaft 16 is formed with an axial bore 46 and carries a runner 48. The runner includes a hub 49 and curved wall 50. The runner 48 is divided into pockets 52 (see also FIG. 3) by blades 54. The wall 50 terminates in an attachment flange 56 to which is secured by means of bolts 58 an attachment flange 60 of a curved casing 62. The casing 62 is provided at its inner end with a hub 64 having a projection 66 and a radially extending lip 67.

The runner 48 is provided with two bleed equally spaced passageways 68. Each of the passageways extends through one of the blades 54 and parallel to the axis of the driven shaft 16. The casing 62 is formed with two bleed passageways 70 located adjacent the flange 60 and four bleed passageways 72 located adjacent the hub 64.

The housing 12 has aligned bores 76 and 78. Projecting through the bore 76 and rotatably mounted therein by means of a bearing 80 is an inlet tube 82 having a peripheral flange 84. The driven shaft 16 is rotatably supported by bearings 86 mounted within the bore 78. The hub projection 66 of the casing 62 engages the flange 84 of the tube 82.

The drive shaft 14 extends through the bore 46 of the driven shaft 16. A bearing 88 is provided between the shaft 14 and the hub 64 of the casing 62. The impeller 30 is mounted within the casing 62 and coaxially with the runner 48. The impeller and runner together define a toroidal chamber 90. The outer faces 91 and 92 of the impeller and runner are situated in mutually opposed relationship defining a clearance 94. The lip member 44 overlies the respective openings 23 of the passageways 22 and so as to define an annular chamber 96 providing communication between the passageways 22 and the passageways 40. The shoulder 24, the hub 49 and the wall 50 together define an annular chamber 98 providing communication between the passageways 20 and the clearance 94 between the faces 91 and 92. The bleed passageways 68 are positioned at the hydraulic center of the toroidal chamber 90.

Figure 2:
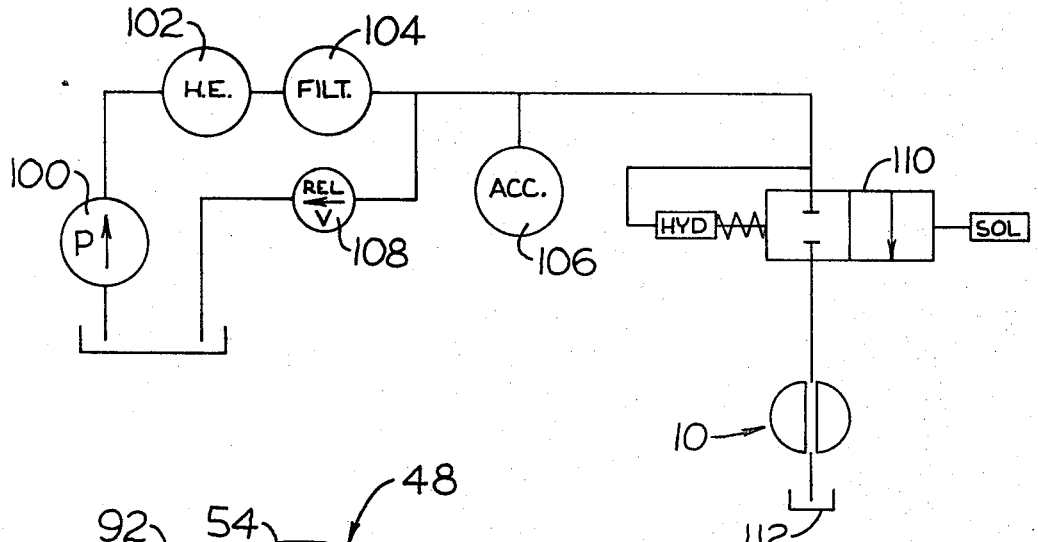
FIG. 2 is a diagrammatic view of a control system for the coupling of FIG. 1.

The operation of the coupling will be described with additional reference to FIG. 2. Hydraulic fluid is supplied to the coupling by means of a conventional pump 100. The fluid is pumped through a heat exchanger 102 and a filter 104 and to an accumulator 106, all being of conventional design. A relief valve 108 serves to regulate the level of fluid in the accumulator 106. A solenoid-operated two-way valve 110 controls the flow of fluid from the accumulator 106 into the coupling. A drainage receptacle 112 is provided for receiving fluid drained from the coupling.

When the coupling is to be filled, the valve 110 is opened and a large volume of hydraulic fluid being under pressure then passes from the accumulator 106 and into the inlet tube 82. A filling pressure in the approximate range of 50–150 p.s.i. at the tube 82 is preferred.

The fluid from the inlet tube 82 enters the passageway 18. A portion of such fluid flows from the passageway 18 through the passageway 22 and into the chamber 96. From the chamber 96 the fluid is directed by the lip member 44 into the passageway 40. The fluid thus flows into several of the pockets 36 of the impeller 30. The remainder of the fluid in the passageway 18 flows through the passageways 20 and into the chamber 98. From the chamber 98 such fluid passes through the clearance 94 and into the toroidal chamber 90.

During the filling of the coupling, air and foam escape from the impeller 30 through the bleed passageways 68. After the coupling has been filled oil may bleed off through passageways 68 with no apparent effect on the operation of the coupling. Foam and air which may be trapped behind the lip member 44 is also provided a means of escape from the coupling through the bleed passageways 70 and 72.

Unusually rapid filling of the coupling 10 is assured as a result of the provision of two paths of fluid supply to the toroidal chamber 90, i.e., the passageway 40 and the clearance 94. Such rapid filling is also facilitated by the bleed passageways 68, 70 and 72. Under the pressure conditions discussed hereinabove, the coupling may be filled in less than one second.

The coupling may operate at speeds in excess of 10,000 r.p.m. with torque being efficiently transmitted from the drive shaft 14 to the driven shaft 16. Slip is reduced from 100% to 10% at 12,000 r.p.m. initial input speed in less than two seconds. A peak torque of about 350 lb. ft. may be reached about one-half second after filling has been started.

Dumping of the coupling fluid is accomplished by simply closing valve 110. Without fluid under pressure being supplied, leakage from passages 70 and 72 quickly exhaust the fluid. Dumping need not be accomplished as quickly as filling to meet practical requirements.

As a consequence of the relatively fast rate of filling and dumping of the coupling, the period of torque interruption is minimized. At the same time, a level of performance is obtained approximating that of the clutch of a power shift planetary transmission disc-type clutch.

The coupling can be constructed in a size which is small enough to be economical and is operable with a comparatively small pump 100.

We claim:
1. A fluid coupling for transmitting torque from a rotating drive shaft to a driven shaft, said coupling comprising:
    (a) an impeller adapted for rotation by said drive shaft;
    (b) a runner mounted coaxially with said impeller to define a toroidal chamber, said runner when rotated being adapted to rotate said driven shaft;
    (c) first fluid supply means for supplying hydraulic fluid to said impeller;
    (d) second fluid supply means spaced axially from said first fluid supply means and adapted to supply hydraulic fluid to said chamber; and
    (e) means for bleeding air and foam from said coupling.
2. A fluid coupling in accordance with claim 1 in which said drive shaft is adapted to conduct fluid to said first and second fluid supply means.
3. A fluid coupling in accordance with claim 1 in which said impeller provides a plurality of pockets, said first fluid supply means including a plurality of fluid passageways, each opening into one of said pockets.
4. A fluid coupling in accordance with claim 3 in which said impeller provides a hub adapted to be secured to said drive shaft, said passageways being located adjacent said hub.
5. A fluid coupling in accordance with claim 1 in which said impeller and said runner have respective outer faces situated in opposed relationship, said second fluid supply means being adapted to direct hydraulic fluid intermediate said faces.
6. A fluid coupling in accordance with claim 1 in which said runner is provided with a plurality of blades, said bleed means including a plurality of pasageways, each passageway extending through one of said blades and parallel to the axis of rotation of said runner.
7. A fluid coupling in accordance with claim 6 in which each of said passageways is located adjacent the hydraulic center of said toroidal chamber.
8. A fluid coupling in accordance with claim 1 in which a casing envelops said impeller, said casing having an outer end secured to said runner, said bleed means including a plurality of passageways formed in said casing.
9. A fluid coupling in accordance with claim 8 in which at least some of said passageways are located adjacent said first fluid supply means.
10. A fluid coupling in accordance with claim 8 in which at least some of said pasageways are located adjacent said outer end of said casing.

References Cited
UNITED STATES PATENTS

| | | | |
|---|---|---|---|
| 1,979,930 | 11/1934 | Bauer et al. | 60—54 |
| 2,717,673 | 9/1955 | Zeidler | 60—54 XR |
| 2,748,899 | 6/1956 | Booth et al. | 60—54 XR |

EDWARD K. GEOGHEGAN, *Primary Examiner.*